No. 712,395. Patented Oct. 28, 1902.
D. LIPPY & L. D. PATTEN.
PUMP.
(Application filed Mar. 5, 1901.)
(No Model.) 2 Sheets—Sheet 1.
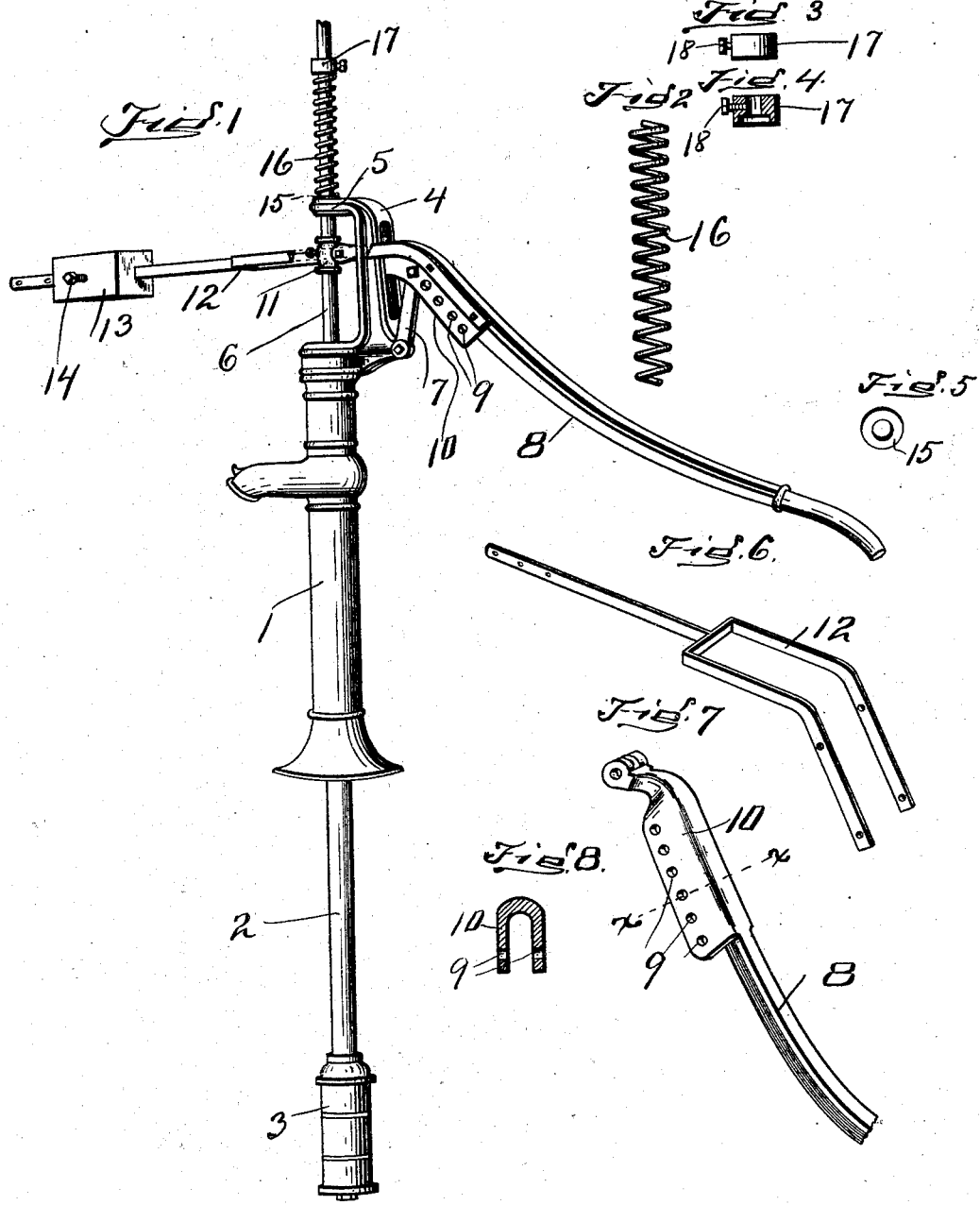

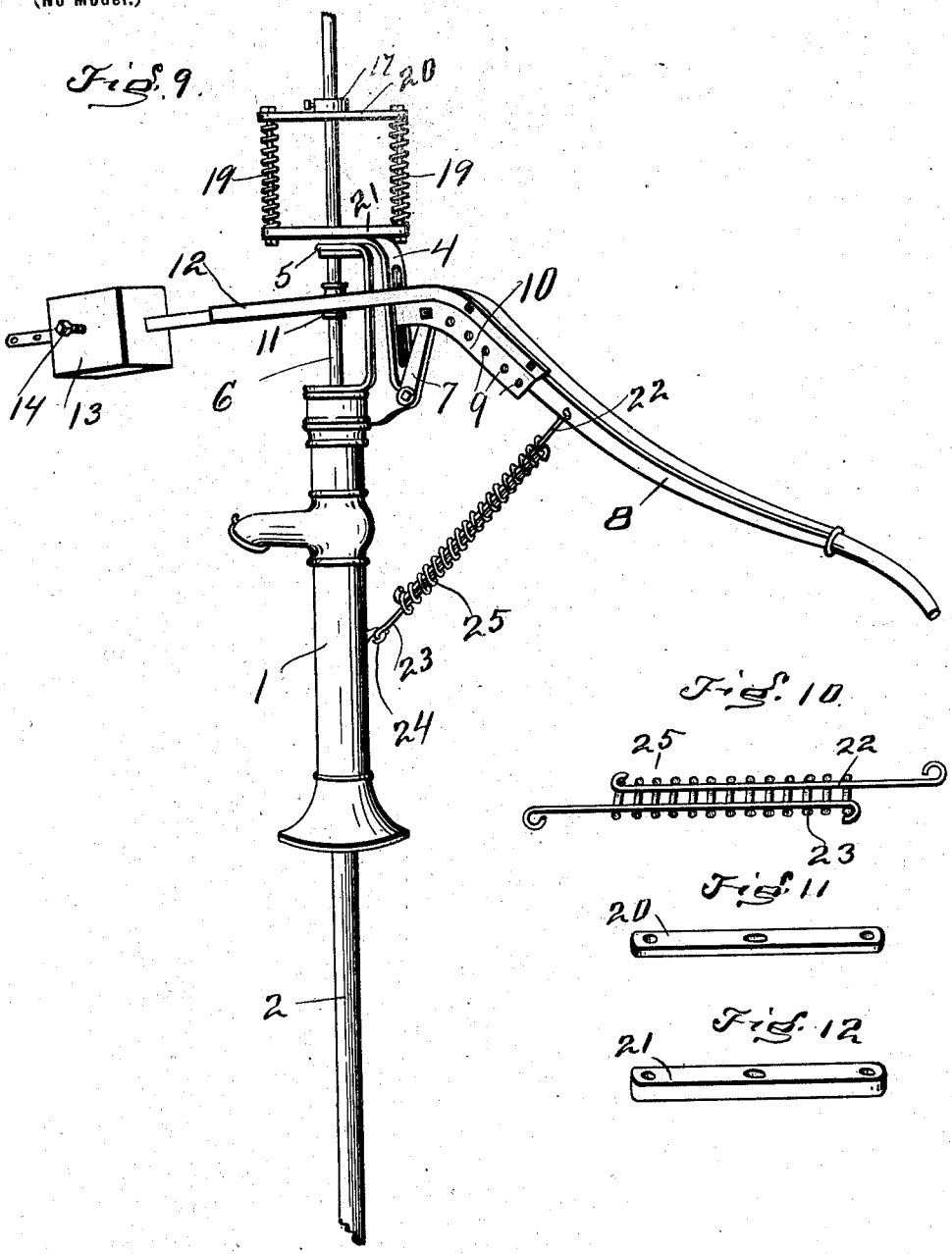

UNITED STATES PATENT OFFICE.

DAVID LIPPY AND LORENZO D. PATTEN, OF MANSFIELD, OHIO.

PUMP.

SPECIFICATION forming part of Letters Patent No. 712,395, dated October 28, 1902.

Application filed March 5, 1901. Serial No. 49,756. (No model.)

*To all whom it may concern:*

Be it known that we, DAVID LIPPY and LORENZO D. PATTEN, citizens of the United States, residing at Mansfield, in the county of Richland and State of Ohio, have invented certain new and useful Improvements in Pumps; and we do hereby declare that the following is a full, clear, and exact description of the same, reference being had to the annexed drawings, making a part of this specification, and to the figures of reference marked thereon, in which—

Figure 1 is a side elevation showing all of the different parts properly assembled. Fig. 2 is a detached view of the lifting-spring. Fig. 3 is a detached view of the lifting-spring collar. Fig. 4 is a sectional view of the lifting-spring collar. Fig. 5 is a detached view of the lower washer. Fig. 6 is a detached view of the lever extension. Fig. 7 is a detached view of the pump-handle. Fig. 8 is a transverse section on line $x\,x$, Fig. 7. Fig. 9 is a side elevation showing a modification or a plurality of lifting-springs. Fig. 10 is a section of the handle-spring and its hooked bars. Fig. 11 is a detached view of the upper lifting-spring bar. Fig. 12 is a detached view of the fixed spring-bar.

The present invention has relation to pumps; and it consists in the different parts and combination of parts hereinafter described, and particularly pointed out in the claim.

Similar numerals of reference indicate corresponding parts in all the figures of the drawings.

In the accompanying drawings, 1 represents the pump-stock, which may be of the form shown, or it may be of any other desired form, to which stock is connected the well-tube 2, said parts being constructed in the ordinary manner and have no particular reference to the present invention, except, of course, said parts must be employed to make a complete working pump.

It will be understood that the well-tube 2 is to be provided with the usual valve of any desired and well-known construction.

To the top or upper end of the stock 1 is connected or formed integral therewith the handle or lever extension flange or frame 4, which may be of the form shown, and as shown it is provided with the overhanging arm 5, which overhanging arm is provided with an aperture, through which the piston-rod 6 moves up and down, as hereinafter described.

To the flange or frame 4, and preferably at the bottom or lower end thereof, is preferably connected the swinging bar 7, to the top or upper end of which swinging bar is preferably connected the pump handle or lever 8, which pump handle or lever may be of any desired form, so far as the hand part of it is concerned, and of any desired length.

For the purpose of changing the fulcrum of the handle or lever 8 said handle or lever is provided with a series of apertures 9, which apertures are formed in the U-shaped portion 10 of said handle or lever, said part being formed U-shaped for the purpose of receiving the top or upper end of the swinging bar 7.

To the piston-rod 6 is connected the sleeved ferrule 11, preferably by a set-screw, but may be attached in any other or well-known manner, as it will be understood that the sleeved ferrule 11 must be securely connected to the piston-rod 6.

To the sleeved ferrule 11 is pivotally connected the inner end of the pump handle or lever 8 by means of a suitable bolt or its equivalent.

To the handle or lever 8 is securely connected the bifurcated lever extension 12 by means of suitable clamping bolts or rivets, said lever extension being formed of any desired length and is extended to the opposite side of the piston-rod from the handle or lever 8 and upon which is adjustably connected a sliding adjustable weight 13, which is held at any desired point of adjustment by means of a set-screw 14 or its equivalent.

If desired, a disk or plate, such as 15, may be located upon the upper side of the overhanging arm 5, and through which disk the piston-rod 6 moves up and down. The disk 15 is for the purpose of receiving and holding the bottom or lower end of the lifting-spring 16, said disk forming a resting-place for the lower end of the spring.

Upon the piston-rod 6 is located the collar or flange 17, which collar or flange is held in proper position and adjustment by means of a set-screw, such as 18, or its equivalent.

Between the collar or flange 17 and the upper side of the disk 15 and around the piston-rod 6 is located the helical or lifting spring 16.

For the purpose of adjusting the tension of the lifting-spring 16, in connection with the adjustment of the sliding weight 13 on the lever extension 12, the collar or flange 17 is moved up or down upon the piston-rod 6, thereby changing the distance between the bottom or under side of said collar and the top or upper side of the overhanging arm 5.

By providing the adjustable weight 13 it can be brought to or from the fulcrum of the operating handle or lever, so that it will be unnecessary to adjust the weight with reference to the tension of the spring 16 except to provide adjustment within narrow limits, or, in other words, the spring 16 is adjusted with reference to the column of water to be lifted and the weight placed upon its arm, and then to bring about the proper equalization the collar 17 is adjusted up and down within a limited space, so as to bring about a true adjustment as between the column of water to be lifted, the tension of the spring 17, and the weight 13.

It will be understood that various adjustments must be employed to bring about the result, reference being had to the height of the column to be lifted or the volume of the column of weight to be lifted.

It will be understood that any desired number of lifting-springs, such as 16, may be employed, if desired, and for the purpose of illustrating this feature we have in Fig. 9 shown two lifting-springs 19, located between the bars 20 and 21, the bar 21 being a fixed one and the bar 20 a movable one, so that as the pump-handle 8 is operated the two springs 19, which are the equivalents of the spring 16, will be compressed and expanded. The collar 17 is adjustable in the same manner as the same collar shown in Fig. 1.

If desired, the hooked rods 22 and 23 may be employed, the hooked rod 22 being connected to the handle 8 and the hooked rod 23 connected to the eye 24 and the spring 25, located between the hooked ends of said rod, and as the handle 8 is moved upward the hooked ends of the rods will be brought toward each other, thereby compressing the spring 25, by which arrangement the stored force of the spring is exerted to pull the handle 8, thereby acting as a counterbalance to the adjustable sliding weight 13.

Having fully described our invention, what we claim as new, and desire to secure by Letters Patent, is—

The combination of a pump-casing provided with a head, a reciprocating rod extended above the head and provided with an adjustable collar, a spring interposed between the head and adjustable collar, a handle provided with a U-shaped portion, said U-shaped portion provided with a series of apertures, a hook pivoted to the head and the U-shaped portion of the handle, a bifurcated extension fixed to the handle and provided with an adjustable weight, and the sleeve fixed to the reciprocating rod and the inner end of the handle pivoted to the sleeve, substantially as specified.

In testimony that we claim the above we have hereunto subscribed our names in the presence of two witnesses.

DAVID LIPPY.
LORENZO D. PATTEN.

Witnesses:
C. E. FRITZINGER,
N. E. SMITH.